(12) United States Patent
Lennartson et al.

(10) Patent No.: US 8,995,396 B2
(45) Date of Patent: Mar. 31, 2015

(54) METHODS AND DEVICES IN A WIRELESS COMMUNICATION NETWORK

(75) Inventors: Benny Lennartson, Hägersten (SE); Mathias Ericsson, Täby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 189 days.

(21) Appl. No.: 13/699,026

(22) PCT Filed: May 21, 2010

(86) PCT No.: PCT/SE2010/050556
§ 371 (c)(1),
(2), (4) Date: Nov. 20, 2012

(87) PCT Pub. No.: WO2011/145992
PCT Pub. Date: Nov. 24, 2011

(65) Prior Publication Data
US 2013/0070615 A1    Mar. 21, 2013

(51) Int. Cl.
*H04W 52/34* (2009.01)
*H04W 52/02* (2009.01)
*H04W 16/00* (2009.01)
*H04W 24/00* (2009.01)
(Continued)

(52) U.S. Cl.
CPC ........ *H04W 52/343* (2013.01); *H04W 52/0206* (2013.01); *H04W 16/00* (2013.01); *H04W 24/00* (2013.01); *H04W 24/10* (2013.01); *H04W 28/04* (2013.01); *H04W 52/143* (2013.01); *H04W 52/322* (2013.01); *H04W 88/02* (2013.01)
USPC .......................................................... 370/331

(58) Field of Classification Search
USPC .................................................. 370/331–334
See application file for complete search history.

(56) References Cited

U.S. PATENT DOCUMENTS

2004/0203855 A1* 10/2004 Veerasamy et al. ........ 455/456.1
2010/0069094 A1   3/2010 Chin et al.
2011/0195707 A1*  8/2011 Faerber et al. ............... 455/423

FOREIGN PATENT DOCUMENTS

WO    2004095853 A2   11/2004
WO    2008040447 A1    4/2008
(Continued)

OTHER PUBLICATIONS

3rd Generation Partnership Project;Technical Specification Group Radio Access Network; User Equipment (UE) procedures in idle mode and procedures for cell reselection in connected mode (Release 7); 3GPP TS 25.304 V7.7.0 (Sep. 2008); pp. 1-41.

*Primary Examiner* — Hoon J Chung
(74) *Attorney, Agent, or Firm* — Murphy Bilak & Homiller, PLLC (57) ABSTRACT

A user equipment method and a user equipment in idle mode, for enabling the compilation of information concerning the radio coverage within a cell of a base station. The user equipment is configured to communicate with the base station. The method comprises the actions of detecting a loss of coverage and transmitting coverage information, to be received by the base station. A network node receives the coverage information from the idle mode user equipment. The received coverage information is identified as information related to the occurrence of lost coverage for the user equipment. Thereafter is the received coverage information logged and usable for adjusting the transmission power of the base station and/or for network planning purposes.

17 Claims, 9 Drawing Sheets

(51) Int. Cl.
*H04W 24/10* (2009.01)
*H04W 28/04* (2009.01)
*H04W 52/14* (2009.01)
*H04W 52/32* (2009.01)
*H04W 88/02* (2009.01)

(56) References Cited

FOREIGN PATENT DOCUMENTS

| | | |
|---|---|---|
| WO | 2010049243 A1 | 5/2010 |
| WO | 2010051838 A1 | 5/2010 |

* cited by examiner

METHODS AND DEVICES IN A WIRELESS COMMUNICATION NETWORK

TECHNICAL FIELD

The present invention relates to a user equipment and a method in a user equipment. Further, the present invention relates to a network node and a method in a network node. More in particular, the invention concerns a mechanism for determining the compilation of information concerning the radio coverage within a cell.

BACKGROUND

There is a strong drive to reduce unnecessary power used in the wireless communication networks, such as e.g. Global System for Mobile Telecommunications (GSM) networks or Wideband Code Division Multiple Access (WCDMA), primarily due to energy efficiency reasons.

One suggestion is to reduce the output power of the Broadcast Control Channel (BCCH) carrier. As transmissions are made over the BCCH twenty-four hours, all around the year, also a small reduction of output power may result in large power savings aggregated over time. However, operators are reluctant to reduce BCCH power, since they are afraid of loosing coverage. In GSM the power of the BCCH carrier defines the cell border towards the noise floor.

It has been suggested to reduce the BCCH power for capacity cells. That is, for cells with no traffic close to the noise floor, for example, cells covering a park in a city or a cell covering a football stadium. Since the BCCH carrier is transmitting all the time, a large proportion of the power used on a site is to provide the BCCH carrier.

Another problem in today's GSM networks is that operators have very little information about where coverage holes are for mobile phones that are in idle mode. In active mode there are many different ways to know where radio traffic has poor coverage.

Statistics exists for Circuit Switched (CS) traffic that is in active mode, i.e. have a call up and running. Here it is possible to monitor if the traffic have good signal strength or not with tools that log e.g. measurement reports and/or other signalling that takes place in active mode. A mobile phone that have a CS call ongoing in GSM will transmit four signalling bursts every 480 ms to the base station, where the received signal burst is derived into a measurement report. However, there is no information about mobile phones that are in idle mode.

For Packet Switched (PS) traffic there are limited possibilities to monitor the signal strength of the traffic. In Packet Transfer Mode there will be information reported by the handset that show what signal strength a connection has. In Packet Idle mode there is no information about signal strength.

Also, a human user may, due to human behaviourism develop a conditioned reflex to avoid coverage holes e.g. by not letting the mobile phone enter active mode in a place where he/she knows the coverage is bad, e.g. in the basement within a building, and instead move to the upper floor before making a phone call, or leave the mobile phone on the upper floor when going down in the basement. Thus by e.g. counting the number of lost connections in active mode does not necessarily give an appropriate picture of the coverage situation in idle mode.

With better knowledge about coverage holes within a wireless communication network, it is possible to build sites and/or adjust transmission power of base stations and/or add nodes to improve coverage.

A GSM mobile in idle mode can "lose coverage" and according to the specifications 3GPP TS 23.122 and 3GPP TS 24.008, a mobile user camping on its home Public Land Mobile Network (PLMN) will not signal when it returns to coverage unless the cell it re-enters in another Location Area or the timer T3212 has expired.

In 3GPP TR 36.805, the minimization of drive tests is discussed and more advanced ideas are discussed.

The operators have problem to know when a GSM mobile phone in idle mode goes out of coverage and comes back into coverage. Cell planning tools may not give enough accuracy and these tools may not have all information about the real traffic.

SUMMARY

It is an object of the present invention to obviate at least some of the above mentioned disadvantages and to provide a mechanism for improving the performance within a wireless communication network.

According to a first aspect, the object is achieved by a method in a user equipment in idle mode. The method aims at enabling the compilation of information concerning the radio coverage within a cell of a base station. The user equipment is configured to communicate with the base station. The method includes detecting a loss of radio coverage and further includes transmitting a return to coverage indication, to be received by the base station, when returning back to radio coverage.

According to a second aspect, the object is also achieved by a user equipment in idle mode. The user equipment is configured for enabling the compilation of information concerning the radio coverage within a cell of a base station. The user equipment is configured to communicate with the base station and it includes a detecting unit configured to detect a loss of radio coverage. The user equipment further includes a transmitter that is configured to transmit a return to coverage indication, to be received by the base station, when the user equipment returns back to radio coverage.

According to a third aspect, the object is also achieved by a method in a network node. The method aims at compiling information concerning the radio coverage within a cell of a base station. The base station is configured to communicate with a user equipment in idle mode. The method comprises receiving a return to coverage indication from the idle mode user equipment. The method further comprises identifying the received return to coverage indication as related to the occurrence of return to coverage for the user equipment. Still further, the method includes logging the received return to coverage indication.

According to a fourth aspect, the object is also achieved by a network node for compiling information concerning the radio coverage within a cell of a base station. The base station is configured to communicate with a user equipment in idle mode. The network node comprises a receiver that is configured to receive a return to coverage indication from the idle mode user equipment. Also, the network node comprises an identifying unit that is configured to identify the received return to coverage indication, as related to the occurrence of return to coverage for the user equipment. The network node also includes logging unit that is configured to log the received return to coverage indication.

Thanks to embodiments of the present methods and devices, it is possible to provide cell/network statistics to pinpoint cells with poor coverage. The statistics can also be used to tune the BCCH power, which in turn can save unnecessary use of output power, or improve cell coverage.

Further, thanks to embodiments of the present methods and devices, the position of the coverage hole can be determined by positioning techniques e.g. by using Timing Advance and/or signal strength and/or by triangulating between a plurality of base stations.

With the elimination of coverage holes according to embodiments of the present methods and devices, roaming performance in the operator network will improve. Areas with a lot of roaming traffic e.g. airports and hotels may benefit in particular from the present methods. A coverage hole in general means that the roaming traffic may go to another operator.

Thus an improved performance within a wireless communication network is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The present solution is defined as a user equipment, a method in a user equipment, a network node and a method in a network node, which may be put into practice in the embodiments described below. The present solution may, however, be embodied in many different forms and should not be construed as limited to the embodiments set forth herein; rather, these embodiments are provided so that this disclosure will be thorough and complete, and will fully convey the scope of the present solution. There is no intent to limit the present methods and devices to any of the particular forms disclosed, but on the contrary, the present methods and devices are to cover all modifications, equivalents, and alternatives falling within the scope of the present solution as defined by the claims.

The present solution may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

Figure 1:
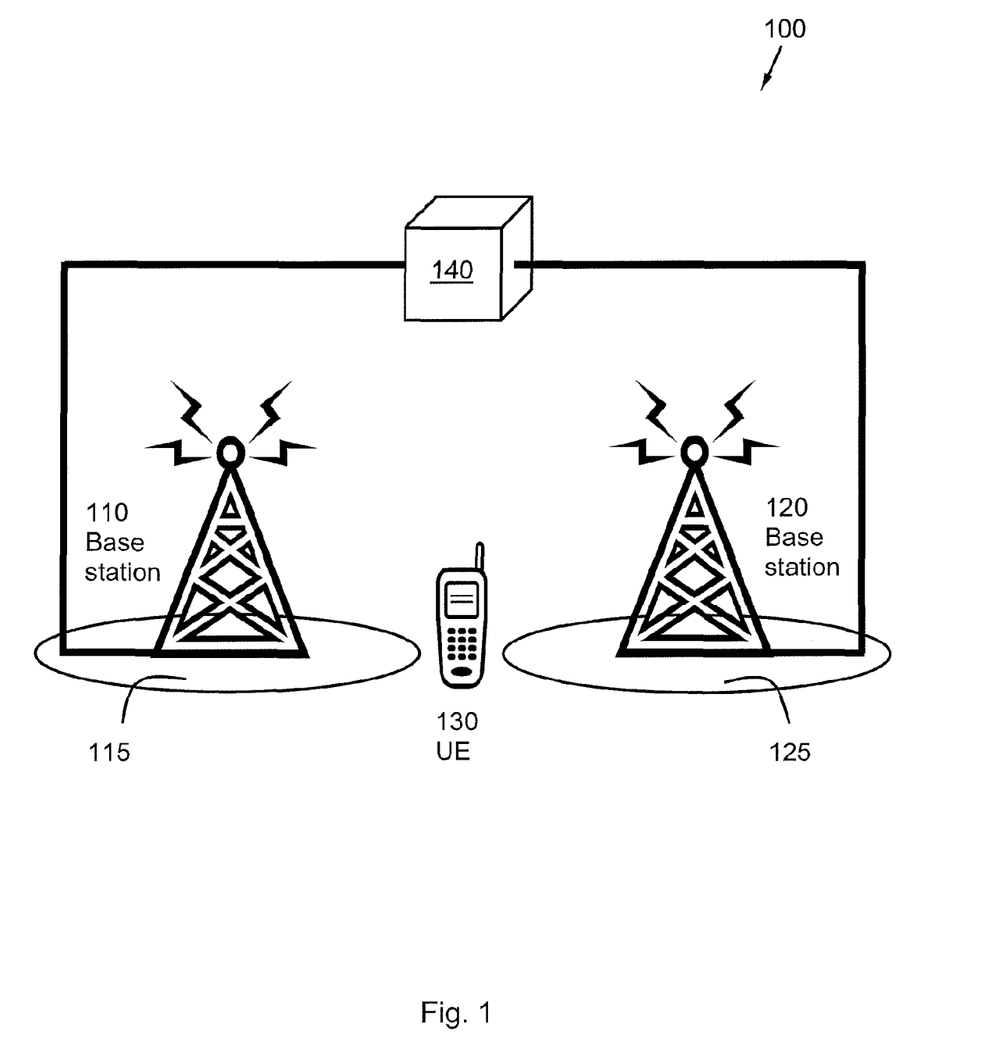
FIG. 1 is a block diagram illustrating a wireless communication network.

FIG. 1 is a schematic illustration over a wireless communication network 100. The wireless communication network 100 comprises at least one base station 110. In FIG. 1, also a second base station 120 is comprised within the network 100. The wireless communication network 100 is further configured to comprise at least one user equipment unit 130. The base station 110 may send and receive wireless signals to and from the user equipment 130, within the cell 115. The second base station 120 may send and receive wireless signals to and from the user equipment 130, within the cell 125 in a corresponding manner.

Further is a network node 140 illustrated in FIG. 1. The network node 140 may comprise any active electronic device that is attached to the network 100, and is capable of sending, receiving, or forwarding information over a communications channel. The network node 140 may be embodied by e.g. a switching point and/or a database such as a Base station controller, a Home Location Register, a Gateway GPRS Support Node (GGSN) a Serving GPRS Support Node (SGSN), an Operation and Maintenance (O&M) node or a base station 110, 120, just to briefly mention some examples of network nodes 140.

Although only two base stations 110, 120, one network node 140 and one user equipment 130 are depicted in FIG. 1, it is to be understood that another configuration of base station transceivers, network nodes and user equipment units, respectively, may be comprised within the wireless communication network 100.

Further, any of the base stations 110, 120 may be referred to as e.g. a Remote Radio Unit, an access point, a Node B, an evolved Node B (eNode B or eNB) and/or a base transceiver station, Access Point Base Station, base station router, etc depending e.g. of the radio access technology and terminology used.

In some embodiments, the user equipment 130 may be represented by a wireless communication device, a wireless communication terminal, a mobile cellular telephone, a Personal Communications Systems terminal, a mobile station (MS), a Personal Digital Assistant (PDA), a laptop, computer or any other kind of device configured for managing radio resources.

The wireless communication network 100 may be based on technologies such as e.g. Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, Time Division CDMA (TD-CDMA), LTE, such as e.g. LTE Rel-8, LTE Rel-9, LTE Rel-10 and/or LTE-Advanced, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS), Wireless Local Area Networks (WLAN), such as Wireless Fidelity (WiFi) and Worldwide Interoperability for Microwave Access (WiMAX), Bluetooth or according to any other wireless communication technology etc, just to mention some few arbitrary and none limiting examples.

The wireless communication system 100 may be configured to operate according to the Time Division Duplex (TDD) and/or the Frequency Division Duplex (FDD) principle.

However, the present solution is herein described in an embodiment focusing on GSM and how it can be implemented in GSM.

The expression "downlink" (DL) is in the present context used to specify the transmission from the base station 110, to the user equipment 130, while the expression "uplink" (UL) is used to denote the transmission from the user equipment 130 to the base station 110, 120.

The conceptual idea underlying the present methods is that the user equipment 130, in idle mode, sends information e.g. in the form of one or several Random Access Channel (RACH) bursts when returning back to coverage after having lost coverage.

The information e.g. RACH bursts to be sent, may comprise a specific number so that the base station 110 is made aware that no channel should be set up, according to some embodiments.

The receiving base station 110 may then compile statistics concerning the number of lost coverage that has occurred within the cell 115. The compiled statistics may be stored together with other related data such as time, timing advance etc, according to some embodiments.

According to some embodiments may the receiving base station 110 forward the received information concerning coverage incidents within the cell 115, to a network node 140, where statistics may be compiled.

The compiled statistics may be used e.g. for increasing the transmission power of the base station 110 in order to cover a coverage hole, as will be discussed in conjunction with FIG. 3A and FIG. 3B. Compiled statistics may be used e.g. for decreasing the transmission power of the base station 110 in order to save energy resources and also reduce downlink interference. This aspect is further discussed in conjunction with FIG. 4A and FIG. 4B. Also, the compiled statistics may according to some embodiments be used e.g. to cover a coverage hole by adding an additional node, which could be a relay node or an additional normal node, to the network 100. This aspect is further discussed in conjunction with FIG. 5A and FIG. 5B.

Figure 2:
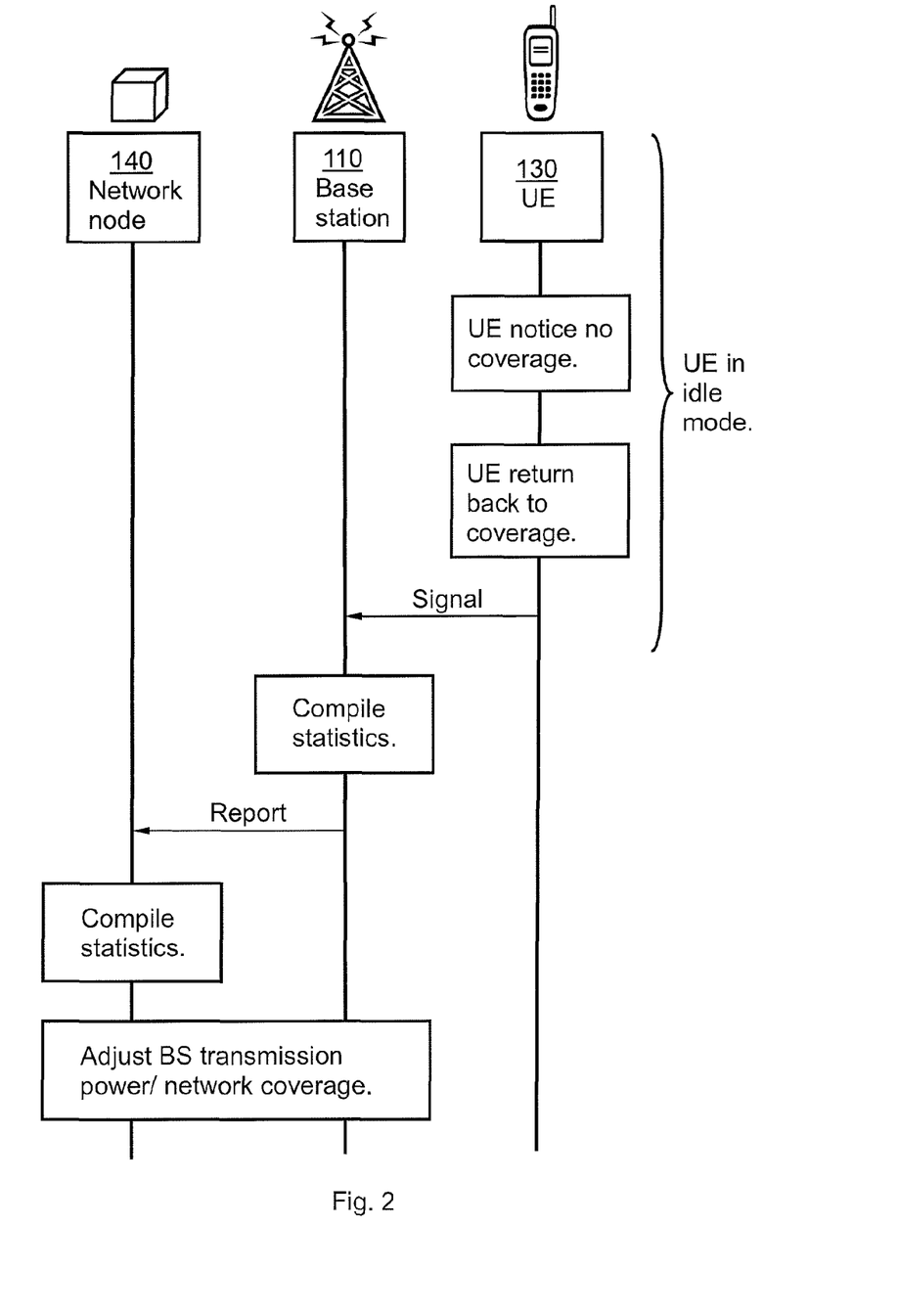
FIG. 2 is a combined flow chart and block diagram illustrating an embodiment of the present methods.

FIG. 2 is a combined flow chart and block diagram illustrating an embodiment of the present methods.

The idea is to force the user equipment 130 to send an indication such as e.g. a RACH-burst, after returning back to coverage, when in idle mode. This transmitted returning back to coverage indication e.g. embodied in form of one or several RACH-bursts may be identified by a number combination that is specifically designed for this purpose, according to some embodiments.

When such returning back to coverage indication, e.g. new RACH-burst, arrives at the base station 110, it may be superfluous to set up a channel. The returning back to coverage indication may just be logged e.g. by the base station 110, potentially together with e.g. time data and timing alignment that may be calculated by the base station 110 when receiving the returning back to coverage indication, e.g. RACH-burst. The returning back to coverage indication may be transmitted if the user equipment 130 is in idle mode or in packet idle mode. That is, embodiments of the present methods may be applied both for circuit switched (CS) and/or packet switched (PS) traffic.

It may be an advantage to transmit the coverage information to the base station 110 as soon as possible when returning back to coverage, in order for the time determination and also the location of the coverage hole to be correct.

The definition of when the user equipment 130 loses coverage and returns back to radio coverage may be when the user equipment 130 goes into PLMN SEARCH state and after that returns back to a cell 115, 125 within the same Location Area, and the user equipment 130 is registered and the timer T3212 has not expired, according to some embodiments.

By just logging this kind of coverage information e.g. RACH-bursts, in the base station 110 it may be possible to create statistics that can be very useful for dealing with the problems described above. Examples of such statistics are shown in Table 1 and Table 2. The information shown in Table 2 could also be used to create a geographical map-view over areas where there are a lot of coverage information transmitted by user equipments 130.

TABLE 1

Example 1 of logged statistics

| CELL | Period | Occurrences |
| --- | --- | --- |
| CELL 115 | 10:00-11:00 | 23 |
| CELL 115 | 11:00-12:00 | 5 |

TABLE 2

Example2 of logged statistics comprising Timing Advance.

| CELL 115 Timing advance | 10:00-11:00 Occurances |
| --- | --- |
| 0 | 0 |
| 1 | 3 |
| 2 | 5 |
| 3 | 1 |
| 4 | 0 |
| 5 | 0 |

Also, the coverage information transmissions according to embodiments of the present methods may be very dominant in a cell 115, 125 that have very much traffic going out of coverage and coming back. This could cause high signalling load on the RACH channel and unnecessary interference.

To limit these problems the present methods may be possible to activate/deactivate per cell 115, 125 according to some embodiments.

The optional activation/deactivation mechanism may according to some embodiments comprise broadcasting an activation/deactivation signal over the BCCH. As the user equipment 130 continuously listen on the BCCH, they become updated concerning if they are to enter active radio coverage feedback state or inactive radio feedback state within a specific cell 115, 125.

However, according to some embodiments may a handshake be performed between the base station 110 and the user equipment 130 as the telephone call is set up, or as the user equipment 130 register on the network 100. The same state i.e. active radio coverage feedback state or inactive radio feedback state may be valid for all the Location Area. When changing Location Areas, the above procedure may be repeated, as the new Location Area may be set to another state.

Since the coverage information transmissions according to embodiments of the present methods most likely is transmitted from a poor coverage area, it is likely that the coverage information transmissions does not reach the base station 110, 120. To overcome this it is suggested that the user equipment 130 according to some embodiments transmits coverage information in form of consecutive RACH bursts, e.g. 3 bursts, with 2 seconds in between, just to mention a non-limiting burst sequence example according to some embodiments. The base station 110, 120 may hear all or just one of these burst, but may only register this as one piece of coverage information from one user equipment 130.

This may according to some embodiments be solved by numbering the bursts or by transmitting the bursts with a certain gap in time. For each detected transmission the base station 110, 120 could also log the time that this RACH arrived, timing advance and the quality, such as e.g. Bit Error Rate (BER).

An advantage with the present methods is that no logging is necessary within the user equipment 130. Also, no Global Positioning System (GPS) or Assisted GPS (A-GPS) units have to be available or activated in the user equipment 130. Further, no new type of message needs to be transmitted by the user equipment 130, just a coverage information message in form of a signal, a sequence of signals, a RACH burst or a sequence of RACH bursts comprising some new number that may be utilised for this purpose, in order to identify the coverage information.

There could be drawbacks with reducing the power of the BCCH. One example is that Packet Switched traffic carried on the BCCH time slots could experience reduced throughput. Thus it may be an advantage according to some embodiments to be able to turn on/off the present mechanism, e.g. by means of a command sent from the base station 110. An activation/deactivation signal may be transmitted from the base station 110 to the user equipment 130 in order to switch on/off, respectively, the present mechanism, as will be further explained in conjunction with FIG. 6, in particular action 601, and FIG. 8, in particular action 807.

Roaming traffic may partly be monitored according to embodiments of the present methods. A user equipment 130 that is roaming and that loses coverage may come back to the same PLMN. In such case the present methods may be usefully applied. However, the roaming user equipment 130 may go to a competitor network. If the user equipment 130 goes to a competitor PLMN, then there is no further information about this user equipment 130. If the roaming user equipment 130 first goes to the competitor, camps on that network, and then comes back, then, when coming back, a normal registration procedure may take place and it is possible to fetch information about roaming traffic by monitoring the normal signalling.

By monitoring the own network traffic and not the roaming traffic in the network 100, it is possible to find areas where user equipment 130 comes back from coverage holes. It is believed that if own traffic have coverage problems in an area, then there is also a problem for roaming traffic.

Figure 3A:
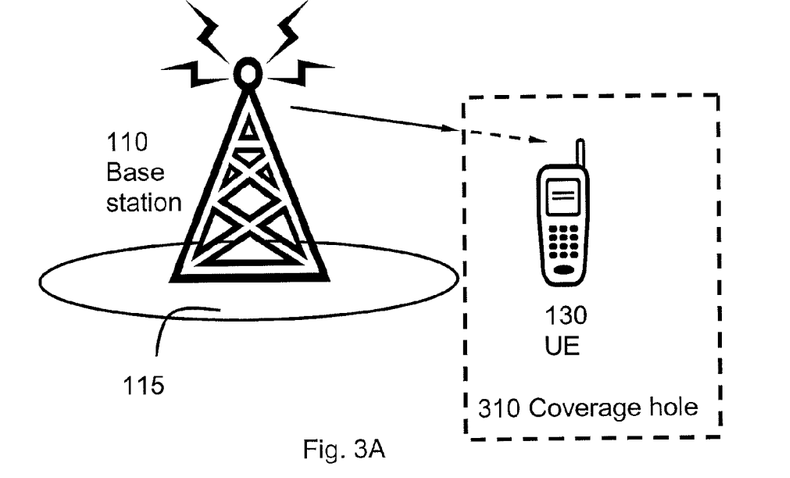
FIG. 3A is a block diagram illustrating a scenario within a wireless communication network comprising embodiments of the present methods.

FIG. 3A is a block diagram illustrating a scenario within a wireless communication network comprising embodiments of the present methods.

The user equipment 130 is in idle mode, and realise it is situated in a coverage hole 310, and cannot receive (or transmit) signals from (to) the base station 110. It is however not possible for the user equipment 130 to immediately report the lost coverage situation to the base station 110, as it has no coverage. Thus the user equipment 130 instead send a return to coverage indication, to be received by the base station 110, when returning back to coverage.

Figure 3B:
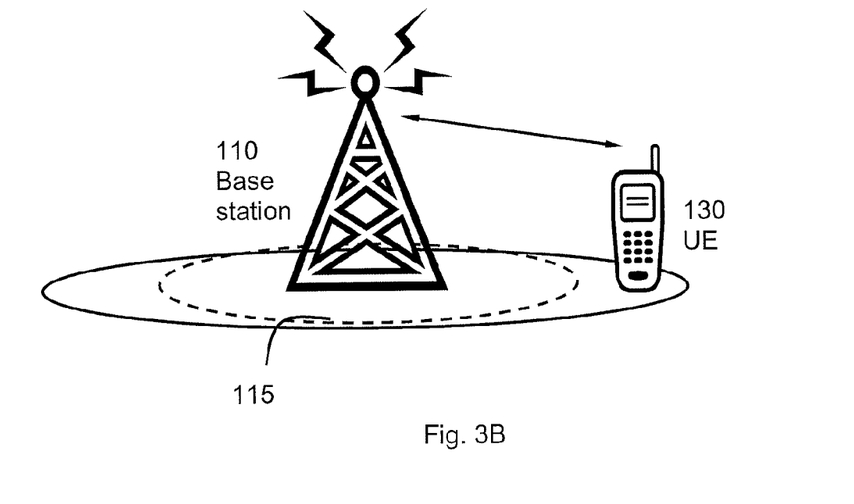
FIG. 3B is a block diagram illustrating a scenario within a wireless communication network comprising embodiments of the present methods.

FIG. 3B is a block diagram illustrating how the base station 110 may use, according to some embodiments, the compiled statistics from return to coverage indications sent from user equipments 130 within the cell 115 may according to some embodiments be used for adjusting the transmission power of the base station 110, i.e. to adjust the size of the cell 115, thereby reducing, minimizing and/or eliminating the coverage hole 310. Alternatively may according to some embodiments the transmission power of the base station 110 be adjusted e.g. on different times of the day. Thus the present methods may be applied in order to provide a dynamic "real-time" functionality, or alternatively an off-line algorithm that executes changes in the network 100 e.g. during nighttimes, according to different embodiments.

Figure 4A:
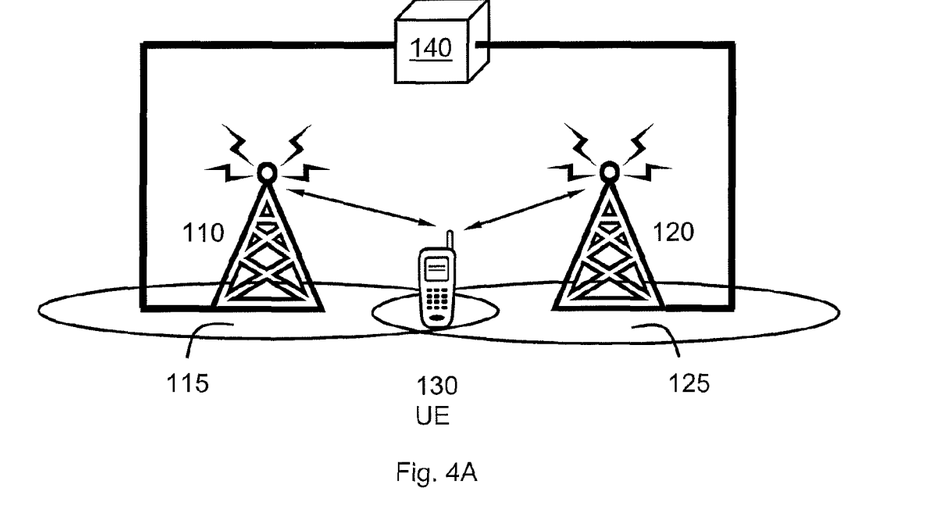
FIG. 4A is a block diagram illustrating a scenario within a wireless communication network comprising embodiments of the present methods.
Figure 4B:
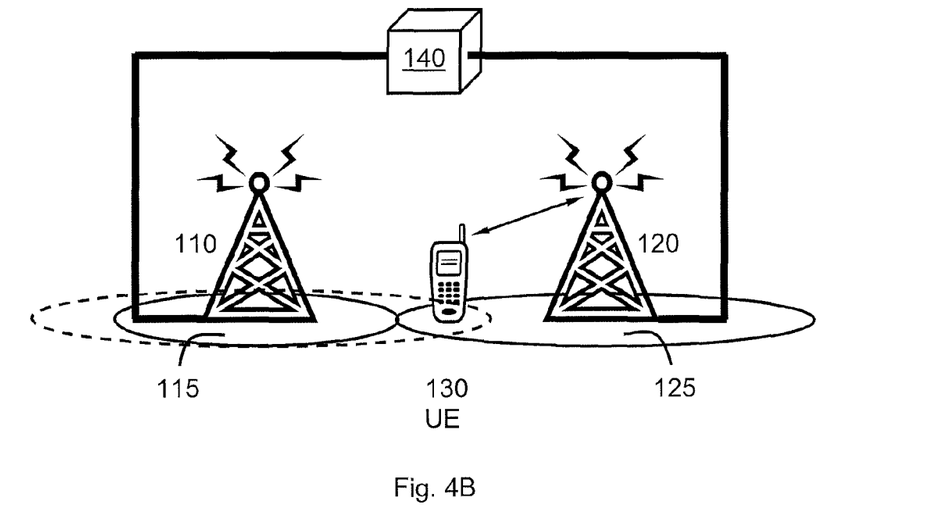
FIG. 4B is a block diagram illustrating a scenario within a wireless communication network comprising embodiments of the present methods.

FIG. 4A is a block diagram illustrating a scenario within a wireless communication network comprising embodiments of the present methods. The present solution may further according to some embodiments be used for adjusting the transmission power of the base station 110 in the opposite direction, i.e. reducing the transmission power of the base station 110. It may be, as illustrated in FIG. 4A that several cells 115, 125 served by several base stations 110, 120 are overlapping each other. Thus energy resources may be wasted. Also, the cells 115, 125 may interfere with each other in the downlink.

Also the coverage hole 310 may be used for reducing the transmission power of the base station 110. In the illustrated scenario in FIG. 4B, the transmission power of the base station 110 is reduced, resulting in a decreased cell 115. However, the user equipment 130 is instead covered by another base station 120, and as no coverage hole 310 is detected, the reduced transmission power of the base station 110 may be considered appropriate, according to some embodiments.

Figure 5A:
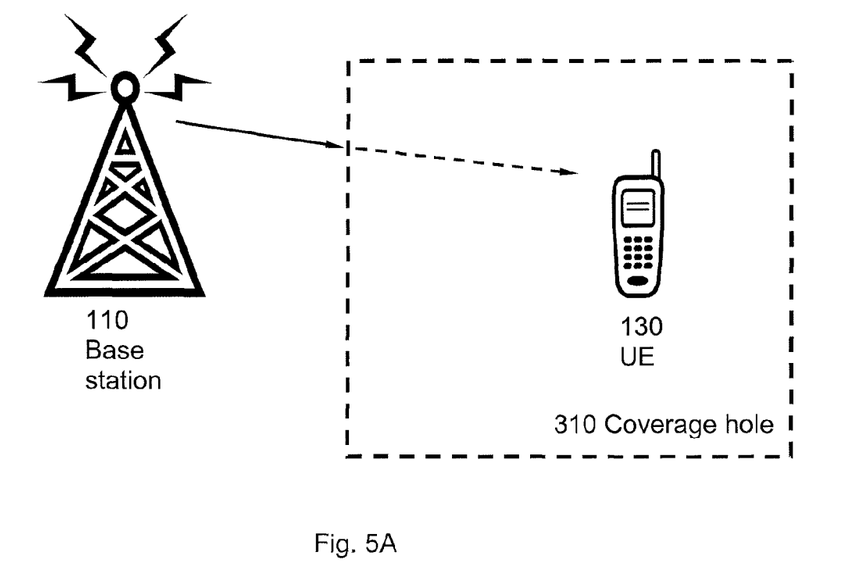
FIG. 5A is a block diagram illustrating a scenario within a wireless communication network comprising embodiments of the present methods.

FIG. 5A is a block diagram illustrating a scenario within a wireless communication network comprising embodiments of the present methods.

The user equipment 130 is in idle mode, and realise it is situated in a coverage hole 310, and cannot receive (or transmit) signals from (to) the base station 110. It is however not possible for the user equipment 130 to immediately report the lost coverage situation to the base station 110, as it has no coverage. Thus the user equipment 130 instead send a return to coverage indication, to be received by the base station 110, when returning back to coverage.

Figure 5B:
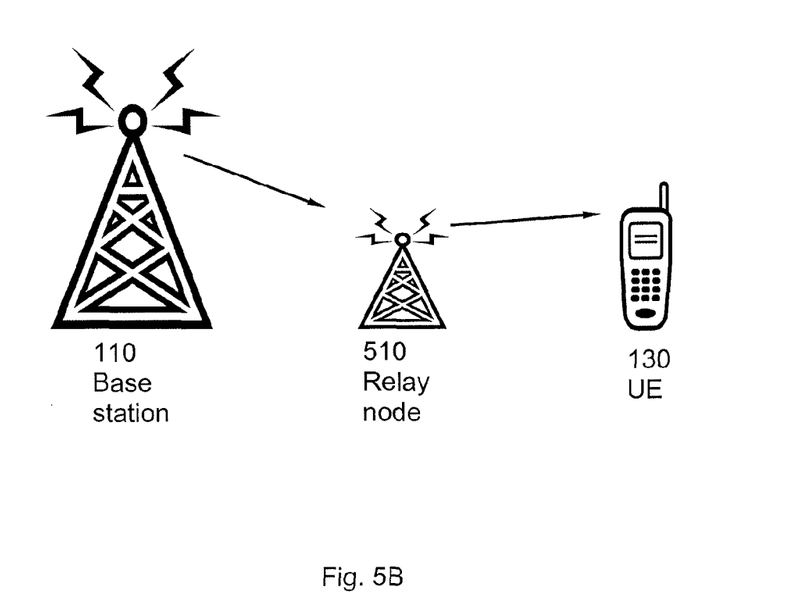
FIG. 5B is a block diagram illustrating a scenario within a wireless communication network comprising embodiments of the present methods.

The return to coverage indication received at the base station 110, or optionally at another network node 140 may be compiled into statistics which in turn may be used for network planning, e.g. to place an added node 510, such as e.g. a relay node in order to cover a detected coverage hole 310, or to add an additional base station and thus create a new cell to cover a detected coverage hole 310 to the wireless network 100 etc as illustrated in FIG. 5B.

The wireless communication network 100 allows transmission/reception of information using a plurality of wireless nodes 110, 120, 130, 140. In general, in the wireless network 100, wireless relay nodes 510 may be installed between base stations 110, 120 which are spaced apart from each other e.g. beyond each communicable range and which may be fixedly installed, or fixed nodes may be wire-connected to each other, thereby enabling long distance communication between the nodes 110, 120 situated at locations spaced apart from each other. Relay nodes 510 may further be installed in order to reach locations where the radio propagation conditions are such that it is difficult to provide a radio service from the base station 110, e.g. in an isolated compartment 310 i.e. inside a building, in a tunnel, in the subway, or similar situation where radio shadow may appear or be experienced by the user equipment 130.

The relay node 510 may be configured to receive and transmit radio signals between the base station 110 and the user equipment 130.

Figure 6:
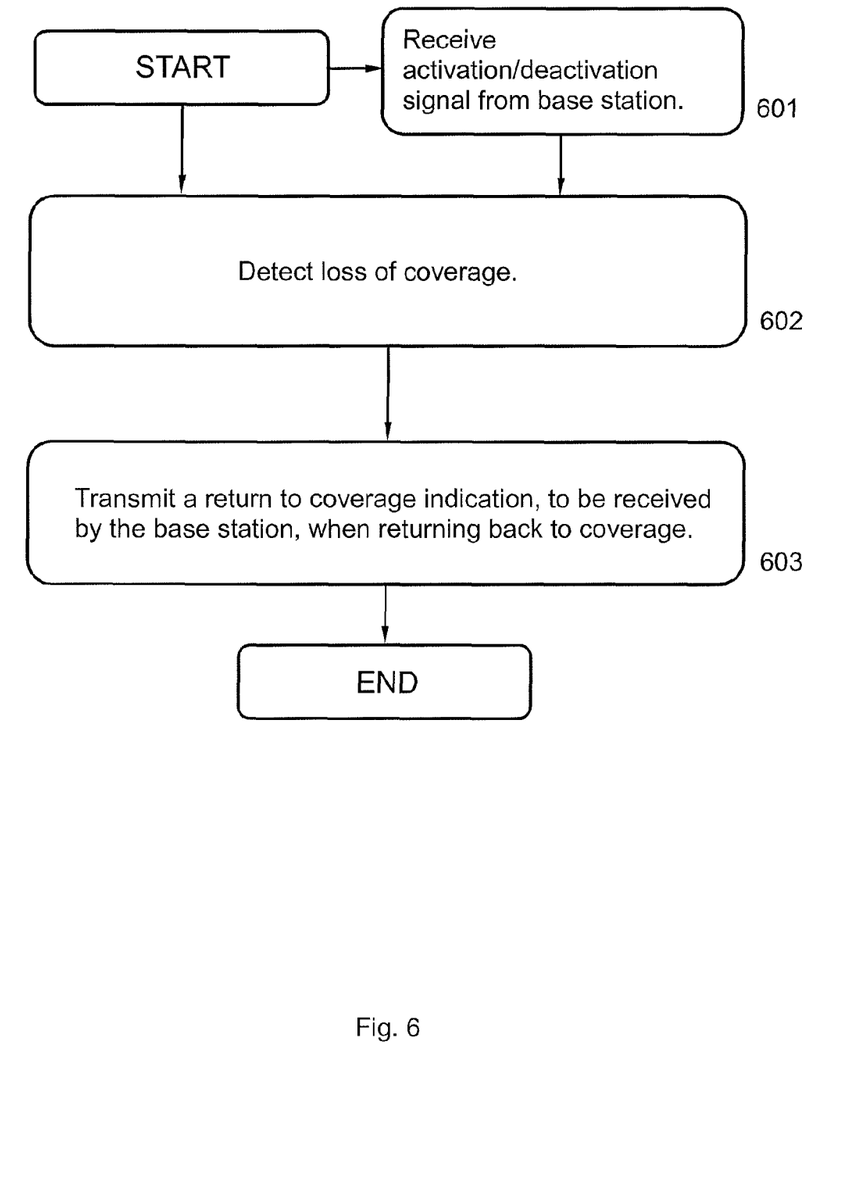
FIG. 6 is a schematic flow chart illustrating embodiments of a method in a user equipment.

FIG. 6 is a schematic block diagram illustrating an example of a method in a user equipment 130 in idle mode. The method aims at enabling the compilation of information concerning the radio coverage within a cell 115 of a base station 110. The user equipment 130 is configured to communicate with the base station 110. The base station 110 and the user equipment 130 may be comprised in a wireless communication network 100.

The method may comprise a number of actions 601-603, in order to correctly enable the compilation of radio coverage related information. The actions may be performed in a somewhat different order than the enumeration indicates.

Action 601

This action is optional and may only be performed within some embodiments of the present method.

An activation/deactivation signal may be received from the base station 110 for setting the user equipment 130 in active/non-active radio coverage feedback state.

It may be an advantage in some scenarios that the network 100 is able to control the behaviour of the user equipment 130, to ensure e.g. appropriate traffic load within the network 100. By transmitting an activation/deactivation signal, the base station 110 may control the transmission of return to coverage indications transmitted within the network 100, i.e. in order to reduce overhead signalling within the network 100. Therefore, it may be an advantage to be able to disable the present method in some situations.

The optional activation/deactivation mechanism may according to some embodiments comprise broadcasting an activation/deactivation signal over the BCCH. As the user equipment 130 continuously listen on the BCCH, they become updated concerning if they are to enter active radio coverage feedback state or inactive radio feedback state within a specific cell 115, 125.

However, according to some embodiments may a handshake be performed between the base station 110 and the user equipment 130 as the telephone call is set up, or as the user equipment 130 register on the network 100. The same state i.e. active radio coverage feedback state or inactive radio feedback state may be valid for all the Location Area. When changing Location Areas, the above procedure may be repeated, as the new Location Area may be set to another state.

Action 602

A loss of coverage is detected.

The user equipment 130 notice that it no longer receives any signals from the base station 110.

Action 603

A return to coverage indication is transmitted when the user equipment 130 is returning back to coverage. The return to coverage indication is to be received by the base station 110.

The return to coverage indication may optionally comprise at least one signal burst transmitted on any of a Random Access Channel or a Packet Random Access Channel, according to some embodiments e.g. in GSM. In other radio access technologies may other, corresponding channels be used for transmitting the return to coverage indication in form of at least one signal burst, according to some embodiments.

The return to coverage indication may according to some embodiments be identifiable by the base station 110 by comprising a dedicated identification number and/or by comprising a predetermined number of signal bursts transmitted at a predetermined time interval.

Such predetermined number of signal bursts may be, to mention some non-limiting examples e.g. 1, 2, 3, 4, 5, 6, 7, 8, 9, 10, or any other number which is a multiple or sum of one or several of the enumerated examples of predetermined numbers. The advantage of transmitting a plurality of signal bursts instead of just one signal burst is that the base station 110 thus may receive at least one of the bursts and thereby receive the return to coverage indication. By transmitting the predetermined number of signal bursts at a predetermined interval, e.g. every x ms where x is an arbitrary positive number, the transmitting user equipment 130 may be identified by the base station 110, even if one, some, or even several signal bursts are not received. This may be an advantage, in particular as the return to coverage indication is transmitted by the user equipment 130 when coming back to coverage, i.e. at the border of, or adjacent to, a coverage hole 310 where the signal propagation conditions may be expected to not be optimal.

However according to some embodiments may the return to coverage indication comprise anonymous, no specific user data.

Optionally may the return to coverage indication comprise further information related to the radio coverage situation. For example may the return to coverage indication comprise a counter displaying the number of times a user has been out of coverage in the specific cell 115, time since last loss of coverage, an indication for how many cell changes that have happened since last lost of coverage, etc.

According to some embodiments may the action of transmitting the return to coverage indication only be performed if the user equipment 130 has been set to active radio coverage feedback state.

Figure 7:
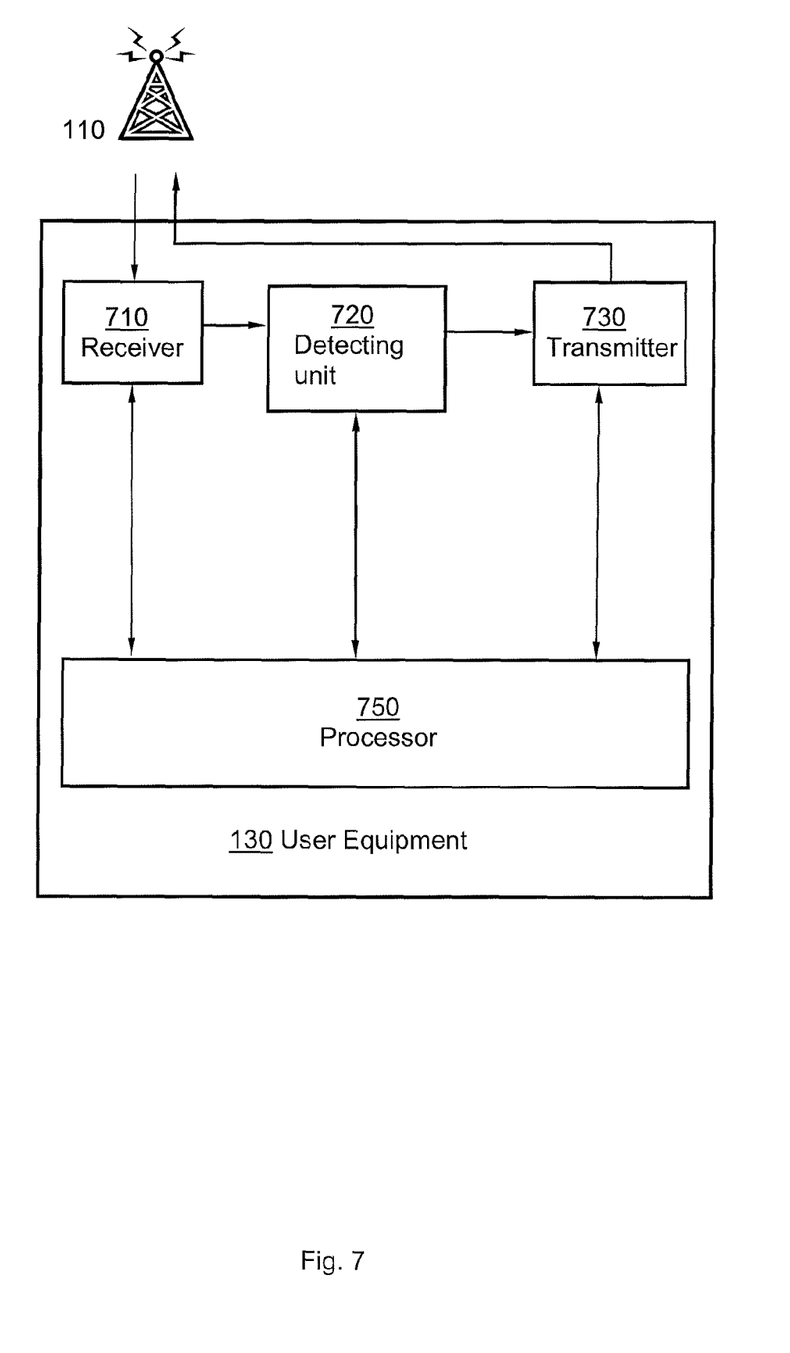
FIG. 7 is a block diagram illustrating embodiments of a user equipment.

FIG. 7 is a block diagram illustrating embodiments of user equipment 130 in idle mode. The user equipment 130 is configured to perform at least some of the actions 601-603 for enabling the compilation of information concerning the radio coverage within a cell 115 of a base station 110. The user equipment 130 is further configured to communicate with the base station 110. The base station 110 and the user equipment 130 may be comprised in a wireless communication network 100.

For the sake of clarity, any internal electronics of the user equipment 130, not completely indispensable for understanding the present method has been omitted from FIG. 7.

The user equipment 130 may comprise, according to some embodiments, a receiver 710. The receiver 710 is configured to receive signals from the base station 110.

The user equipment 130 comprises a detecting unit 720. The detecting unit 720 is configured to detect a loss of coverage. Also, the user equipment 130 comprises a transmitter 730. The transmitter 730 is configured to transmit a return to coverage indication, to be received by the base station 110, when the user equipment 130 is returning back to coverage.

The user equipment 130 may according to some embodiments comprise at least one processor 750. The processor 750 may be represented by e.g. a Central Processing Unit (CPU), a processing unit, a microprocessor, or other processing logic that may interpret and execute instructions. The processor 750 may perform all data processing functions for inputting, outputting, and processing of data including data buffering and device control functions, such as call processing control, user interface control, or the like.

It is to be noted that the described units 710-750 comprised within the user equipment 130 may be regarded as separate logical entities, but not with necessity as separate physical entities. Any, some or all of the units 710-750 may be comprised or co-arranged within the same physical unit. However, in order to facilitate the understanding of the functionality of the user equipment 130, the comprised units 710-750 are illustrated as separate physical units in FIG. 7.

The actions 601-603 in the user equipment 130 may be implemented through one or more processors 750 in the user equipment 130, together with computer program code for performing the functions of the present actions 601-603. Thus a computer program product, comprising instructions for performing the actions 601-603 in the user equipment 130 may perform the method for enabling the compilation of information concerning the radio coverage within a cell 115 of a base station 110.

The computer program product mentioned above may be provided for instance in the form of a data carrier carrying computer program code for performing at least some of the actions 601-603 according to the present solution when being loaded into the processor 750. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the user equipment 130 remotely, e.g. over an Internet or an intranet connection.

Figure 8:
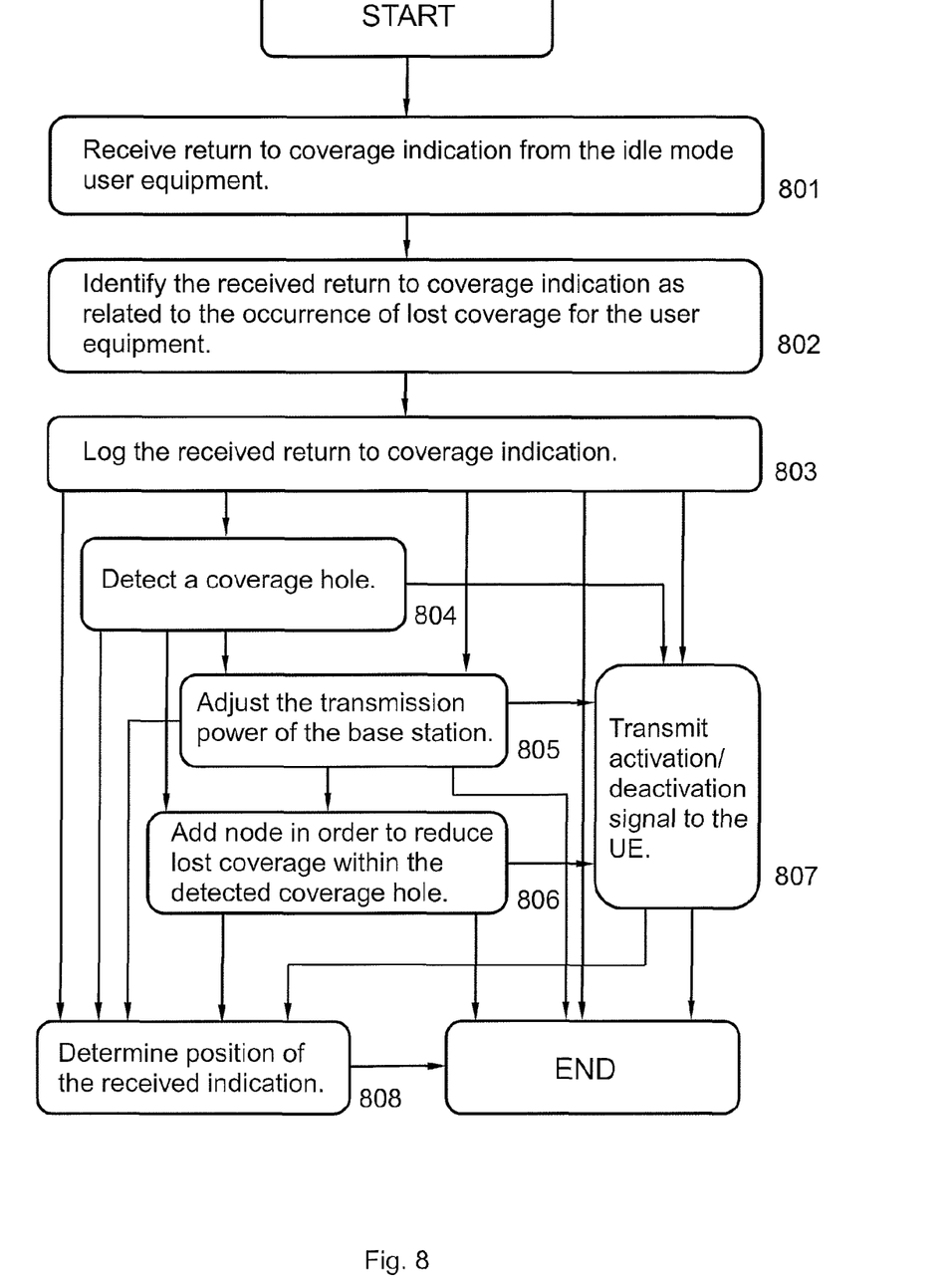
FIG. 8 is a schematic flow chart illustrating embodiments of a method in a network node.

FIG. 8 is a schematic block diagram illustrating an example of a method in a network node 110, 120, 140. The method aims at compiling information concerning the radio coverage within a cell 115 of a base station 110. The base station 110 is configured to communicate with the user equipment 130. The base station 110 and the user equipment 130 may be comprised in a wireless communication network 100.

The network node 110, 120, 140 may according to some embodiments comprise the base station 110. However, the network node 110, 120, 140 may according to some embodiments comprise a network management node 140, configured to receive the return to coverage indication from the user equipment 130, via the base station 110.

The method may comprise a number of actions 801-804, in order to correctly compile the radio coverage related information. The actions may be performed in a somewhat different order than the enumeration indicates.

Action 801

A return to coverage indication is received from the idle mode user equipment 130.

The return to coverage indication may optionally comprise at least one signal burst transmitted on any of a Random Access Channel or a Packet Random Access Channel, according to some embodiments e.g. in GSM. In other radio access technologies may other, corresponding channels be used for transmitting the return to coverage indication in form of at least one signal burst, according to some embodiments.

Action 802

The received return to coverage indication is identified as related to the occurrence of lost coverage for the user equipment 130.

The return to coverage indication may according to some embodiments be identifiable by the base station 110 by comprising a dedicated identification number and/or by comprising a predetermined number of signal bursts transmitted at a predetermined time interval.

Action 803

The received return to coverage indication is logged.

The action of logging may comprise logging the reception time of the return to coverage indication, timing advance, the bit error rate and signal strength of the received return to coverage indication and/or further information related to the received return to coverage indication, according to some embodiments. The logging may also comprise information that may be transmitted in the RACH message, such as the number of loss of coverage indications.

Action 804

This action is optional and may only be performed within some embodiments of the present method.

A coverage hole 310 may be detected, based on the logged return to coverage indication.

The action of detecting the coverage hole 310 may comprise determining the timing advance of the received return to coverage indication.

Action 805

This action is optional and may only be performed within some embodiments of the present method.

The transmission power of the base station 110 may be adjusted, based on the logged return to coverage indication.

The action of adjusting the transmission power of the base station 110 may according to some optional embodiments comprise comparing the number of logged occurrence of lost coverage within a certain time period with a threshold value. Also, according to some embodiments, may the adjustment comprise increasing the transmission power if the number of lost coverage occurrences exceeds the threshold value. Further, for example may according to some embodiments the ratio of loss of coverage indication/average Erlang in the cell be calculated. Such ratio may give an improved indication if it is worth fixing the detected coverage hole or not.

Action 806

This action is optional and may only be performed within some embodiments of the present method.

A node 510 may be added in order to reduce lost coverage within the detected coverage hole 310.

Action 807

This action is optional and may only be performed within some embodiments of the present method.

An activation/deactivation signal may be transmitted to the user equipment 130 for setting the user equipment 130 in active/non-active radio coverage feedback state.

Such activation/deactivation signal may e.g. be broadcasted over BCCH, or determined as the telephone call is set up, or as the user equipment 130 register on the network 100.

Action 808

This action is optional and may only be performed within some embodiments of the present method.

The position from which the return to coverage indication has been transmitted may be determined by applying a positioning algorithm. Thus e.g. the position of the user equipment 130, from which the return to coverage indication has been received, at the moment of transmitting the return to coverage indication may be detected, which at least approximately may correspond to (the border of) the detected coverage hole 310.

The positioning algorithm to be applied may comprise e.g. Timing Advance and/or signal strength and/or by triangulating between a plurality of base stations 110, 120.

Figure 9:
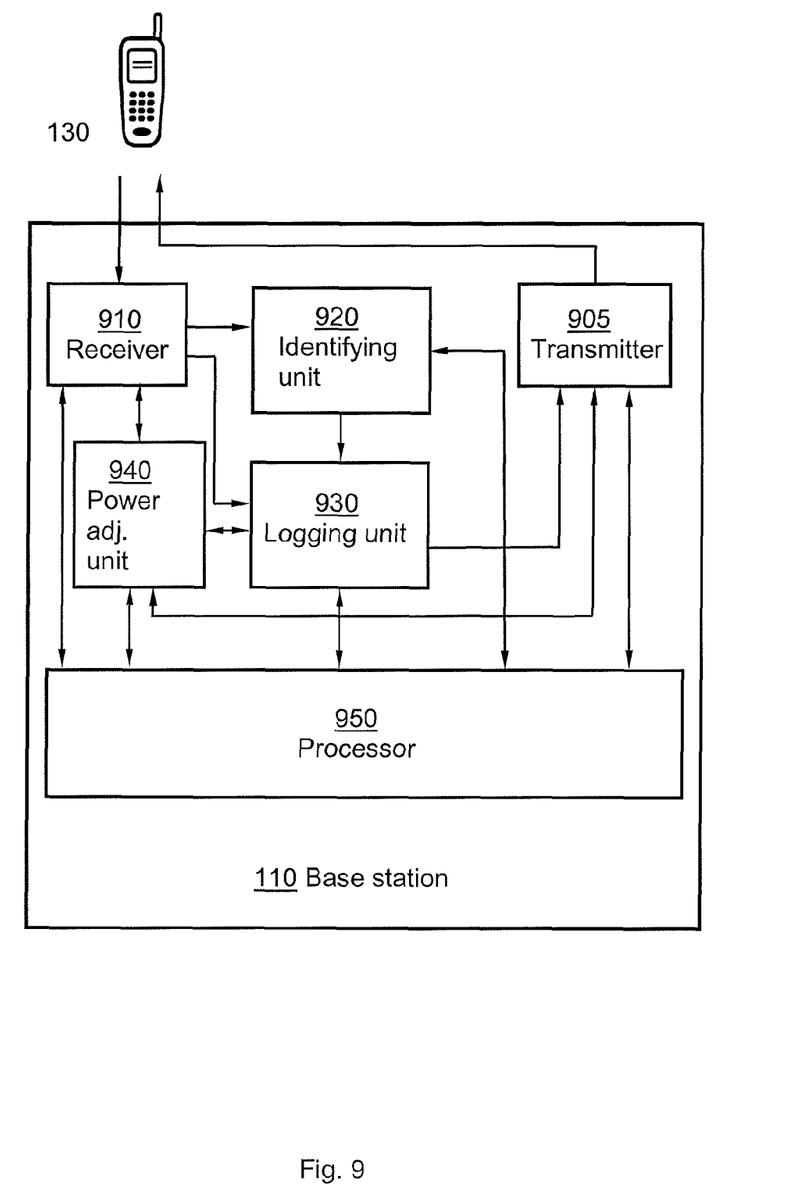
FIG. 9 is a block diagram illustrating embodiments of a network node.

FIG. 9 is a block diagram illustrating embodiments of a network node 110, 120, 140. The network node 110, 120, 140 is configured to perform at least some of the actions 801-808 for compiling information concerning the radio coverage within a cell 115 of a base station 110. The base station 110 is configured to communicate with the user equipment 130. The base station 110 and the user equipment 130 may be comprised in a wireless communication network 100.

The network node 110, 120, 140 may according to some embodiments comprise the base station 110. However, the network node 110, 120, 140 may according to some embodiments comprise a network management node 140, configured to receive the return to coverage indication from the user equipment 130, via the base station 110.

For the sake of clarity, any internal electronics of the network node 110, 120, 140, not completely indispensable for understanding the present method has been omitted from FIG. 9.

The network node 110, 120, 140 comprises a receiver 910. The receiver 910 is configured to receive a return to coverage indication from the idle mode user equipment 130. Also, the network node 110, 120, 140 comprises an identifying unit 920. The identifying unit 920 is configured to identify the received return to coverage indication as related to the occurrence of lost coverage for the user equipment 130. Further, the network node 110, 120, 140 comprises a logging unit 930. The logging unit 930 is configured to log the received return to coverage indication.

According to some embodiments may the network node 110, 120, 140 comprise a transmitter 905. The transmitter 905 is configured to transmit an activation/deactivation signal that may be transmitted to the user equipment 130 for setting the user equipment 130 in active/non-active radio coverage feedback state.

In addition may the network node 110, 120, 140 comprise a power adjustment unit 940. The power adjustment unit 940 is configured to adjust the transmission power of the base station 110, based on the logged return to coverage indication. According to some embodiments may the network node 110, 120, 140 comprise means for comparing the number of logged occurrence of lost coverage within a certain time period with a threshold value. Also, according to some embodiments, may the power adjustment unit 940 comprise means for increasing the transmission power if the number of lost coverage occurrences exceeds the threshold value. Correspondingly may the transmission power be reduced when the number of lost coverage occurrences is lower than another certain threshold value, according to some embodiments.

The network node 110, 120, 140 may according to some embodiments comprise at least one processor 950. The processor 950 may be represented by e.g. a Central Processing Unit (CPU), a processing unit, a microprocessor, or other processing logic that may interpret and execute instructions. The processor 950 may perform all data processing functions for inputting, outputting, and processing of data including data buffering and device control functions, such as call processing control, user interface control, or the like.

It is to be noted that the described units 905-950 comprised within the network node 110, 120, 140 may be regarded as separate logical entities, but can be placed in separate physical entities as well as any, or all, of the units 905-950 may be comprised or co-arranged within the same physical unit. However, in order to facilitate the understanding of the functionality of the network node 110, 120, 140, the comprised units 905-950 are illustrated as separate physical units in FIG. 9.

The actions 801-808 in the network node 110, 120, 140 may be implemented through one or more processors 950 in the network node 110, 120, 140, together with computer program code for performing the functions of the present actions 801-808. Thus a computer program product, comprising instructions for performing the actions 801-808 in the network node 110, 120, 140 may perform the method for compiling information concerning the radio coverage within a cell 115 of a base station 110.

The computer program product mentioned above may be provided for instance in the form of a data carrier carrying computer program code for performing at least some of the actions 801-808 according to the present solution when being loaded into the processor 950. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the network node 110, 120, 140 remotely, e.g. over an Internet or an intranet connection.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method at a user equipment configured for operation in a wireless communication network and comprising:
   receiving an activation/deactivation signal from a base station;
   setting the user equipment to an active radio coverage feedback state if the signal received is an activation signal;
   detecting a loss of radio coverage in the user equipment; and
   transmitting at least one signal burst transmitted on a Random Access Channel or Packet Random Access Channel in response to the user equipment returning back to radio coverage and being set to the active radio coverage feedback state, wherein the at least one signal burst is transmitted in a manner known to the base station as being indicative of a return to coverage indication,
   wherein the at least one signal burst does not include location information for the user equipment and information about the loss of coverage.

2. The method according to claim 1, wherein transmitting the at least one signal burst comprises transmitting at least two signal bursts according to a defined numbering or timing indicative of the return to coverage indication.

3. The method according to claim 1, wherein the at least one signal burst includes a dedicated identification number defined as being indicative of the return to coverage indication.

4. The method according to claim 1, wherein the at least one signal burst in a manner known to the base station as being indicative of the return to coverage indication comprises transmitting a predetermined number of signal bursts transmitted at a predetermined time interval.

5. The method according to claim 1, wherein transmitting at least one signal burst in a manner known to the base station as being indicative of the return to coverage indication comprises transmitting with a defined burst numbering or a defined burst timing.

6. A user equipment comprising:
a transmitter;
a processor configured to:
   detect a loss of radio coverage within a cell of a base station; and
   enable compilation of information concerning radio coverage within the cell, based on transmitting via the transmitter, at least one signal burst transmitted on a Random Access Channel or Packet Random Access Channel in response to returning back to radio coverage, wherein the at least one signal burst is transmitted in a manner known to the base station as being indicative of a return to coverage indication,
   wherein the at least one signal burst does not include location information for the user equipment and information about the loss of coverage.

7. The user equipment according to claim 6, wherein the processor is configured to:
   receive an activation/deactivation signal;
   set the user equipment to an active radio coverage feedback state if the activation/deactivation signal is an activation signal; and
   indicate the return to coverage indication via the transmitter only if the user equipment is set to the active radio coverage feedback state.

8. A method at a network node of compiling information concerning radio coverage within a cell of a base station, said method comprising:
   receiving at least one signal burst transmitted by a user equipment in idle mode on a Random Access Channel or Packet Random Access Channel;
   identifying the at least one signal burst as being a return to coverage indication indicating that the user equipment has returned to radio coverage after detecting a loss in radio coverage, based on identifying that the at least one signal burst was transmitted in a manner known as being indicative of a return to coverage indication; and
   logging the received return to coverage indication in the network node,
   wherein the at least one signal burst does not include location information for the user equipment and information about the loss of coverage.

9. The method according to claim 8, further comprising transmitting an activation/deactivation signal from the base station to the user equipment, to control whether the user equipment operates in an active radio coverage feedback state, in which state the user equipment is configured to indicate return to coverage indications, or operates in a non-active radio coverage feedback state, in which state the user equipment is configured not to indicate return to coverage indications.

10. The method according to claim 8, further comprising adjusting a transmission power of the base station, based on the logged return to coverage indication.

11. The method according to claim 8, further comprising detecting a radio coverage hole, based on the logged return to coverage indication.

12. The method according to claim 11, wherein detecting the radio coverage hole comprises determining the timing advance of the received return to coverage indication.

13. The method according to claim 11, further comprising determining the position from which at least one signal burst has been transmitted by applying a positioning algorithm.

14. The method according to claim 8, wherein logging the received return to coverage indication comprises logging any one or more of: a reception time of the return to coverage indication, a timing advance of the received return to coverage indication, and a bit error rate of the received return to coverage indication.

15. The method according to claim 8, wherein the network node comprises the base station.

16. The method according to claim 8, wherein receiving the the at least one burst signal comprises receiving the at least one burst signal via the base station.

17. A network node for compiling information concerning the radio coverage within a cell of a base station, comprising:
   a receiver configured to receive at least one signal burst transmitted by a user equipment in idle mode on a Random Access Channel or Packet Random Access Channel; and
   a processor configured to:
      identify the received at least one signal burst as being a return to coverage indication indicating that the user equipment has returned to radio coverage after detecting a loss of radio coverage, based on determining that the at least one signal burst was transmitted in a manner known as being indicative of the return to coverage indication; and
      log the received return to coverage indication,
      wherein the at least one signal burst does not include location information for the user equipment and information about the loss of coverage.

* * * * *